United States Patent [19]

Smilanich

[11] 4,248,944
[45] Feb. 3, 1981

[54] SEALS FOR ELECTROCHEMICAL CELLS

[75] Inventor: Nicholas J. Smilanich, Rocky River, Ohio

[73] Assignee: Union Carbide Corporation, New York, N.Y.

[21] Appl. No.: 106,025

[22] Filed: Dec. 21, 1979

[51] Int. Cl.$^3$ ............................................... H01M 2/08
[52] U.S. Cl. ..................................... 429/185; 429/174
[58] Field of Search ................. 429/185, 174, 171–173

[56] References Cited

U.S. PATENT DOCUMENTS

| 3,068,313 | 12/1962 | Daley | 429/174 |
|---|---|---|---|
| 3,288,728 | 11/1966 | Gorham | 528/86 |
| 3,342,754 | 9/1967 | Gorham | 528/396 |
| 3,503,903 | 3/1970 | Shaw et al. | 528/396 |
| 3,600,216 | 8/1971 | Stewart | 428/417 |
| 3,713,896 | 1/1973 | Feldhake | 429/174 |
| 3,895,135 | 7/1975 | Hofer | 427/248 |
| 3,922,178 | 11/1975 | Winger | 429/82 |
| 3,990,918 | 11/1976 | Bro et al. | 429/185 |

OTHER PUBLICATIONS

Union Carbide Corporation, Parylene Environmentally Compatible Conformal Coatings.
Union Carbide Corporation, Bakelite Parylene.
Japanese published unexamined patent application 53/136,625.

Primary Examiner—Anthony Skapars
Attorney, Agent, or Firm—Cornelius F. O'Brien

[57] ABSTRACT

An improved seal for alkaline cells comprising a gasket, a thin film of parylene and a layer of a polyamide, an epoxy resin, asphalt or a cured epoxy-polyamide resin disposed and compressed between the interface of the cover and the container of the cell providing a fluid tight seal thereat.

9 Claims, No Drawings

SEALS FOR ELECTROCHEMICAL CELLS

FIELD OF THE INVENTION

The invention relates to the sealing of electrochemical cells and specifically to the sealing of the interface between the container and cover of the cell using a gasket, a thin film of parylene and a layer of a polyamide, an epoxy resin, asphalt or a cured epoxy-polyamide resin.

BACKGROUND OF THE INVENTION

The ability of alkaline electrolytes to wet a metal surface is one of the major causes of leakage in alkaline galvanic cells. The alkaline electrolyte, by wetting the surface of the metal, can actually "creep" through a sealed metal interface. For this reason, elaborate precautions have been made to prevent the electrolyte in an alkaline cell from contacting the interface between a seal and certain metal parts of a seal, such as the metal container and the metal cover of the cell. Typical cell systems where this problem is encountered include silver oxide-zinc cells, nickel-cadmium cells, air depolarized cells and alkaline manganese dioxide cells. In the prior art it has been a conventional practice to incorporate insulating gaskets between the cell container and cover so as to provide a seal for the cell. Generally, the gasket must be made of a material inert to the electrolyte contained in the cell and the cell environment. In addition, it had to be sufficiently flexible and resistant to cold flow under pressure of the seal and maintain these characteristics so as to insure a proper seal during long periods of storage. Material, such as nylon, polypropylene, ethylene-tetra-fluoroethylene copolymer (Tefzel) and high density polyethylene have been found to be suitable as gasket materials for most applications.

However, due to the propensity of alkaline electrolytes, such as aqueous potassium hydroxide and sodium hydroxide solutions, to wet metal surfaces, the use of gaskets, such as nylon, have not completely solved the leakage problem. Unfortunately, electrolyte leakage not only depletes the electrolyte solution from the cell but can also cause a corrosive deposit at the cover-container interface that not only affects the cell's appearance but could also cause damage to the device in which the cell is used. In addition, if leakage occurs while the cell is being transported and stored at a retailer's establishment, then the cell becomes unmarketable, resulting in a total loss.

U.S. Pat. No. 3,922,178 discloses a sealing means for alkaline batteries which comprises the use of a polyamide, specifically a fatty polyamide, as a seal or protective coating to prevent alkaline electrolyte from wetting surfaces within the cell.

U.S. Pat. No. 3,713,896 discloses an insulating seal for alkaline cells which consists of a layer of cured epoxy-polyamide resin located and compressed between a metallic container and a metallic cover.

It is an object of the present invention to provide an electrochemical cell with an improved sealing means to prevent electrolyte leakage from the cell.

It is another object of the present invention to provide an alkaline battery seal for use at the interface of the container and cover of the cell which comprises a nonconductive gasket, a thin film of parylene and a layer of a polyamide, an epoxy resin, asphalt, or a cured epoxy polyamide resin compressed between the interface of the container and the cover of the cell.

It is another object of the present invention to provide a seal for electrochemical cells which comprises a nonconductive gasket, such as nylon, a thin film of parylene and a layer of a polyamide, such as a fatty polyamide, disposed and squeezed between the interface of the cover and container of the cell.

The foregoing and additional objects will become more fully apparent with the following description.

SUMMARY OF THE INVENTION

The invention relates to a sealed electrochemical cell comprising a cathodic material, an anodic material and an electrolyte housed in a container sealed at its open end by a closure which comprises a cover, a nonconductive gasket and a layer of a polyamide, an epoxy resin, asphalt, or a cured epoxy-polyamide resin, said gasket and said layer disposed and compressed between the interface of the cover and the container, the improvement being a thin film of parylene disposed between the gasket and the layer interface thereby forming a fluid tight seal between the cover and container of the cell.

As used herein, parylene is a generic name for members of a thermoplastic polymer series in which the basic member of the polymer family is parylene N, polypara-xylylene having the formula

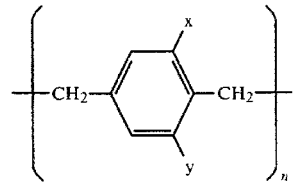

where x and y may be H or Cl and n is greater than 5000.

Chloro-substituted parylenes, such as polymonochloro-p-xylylene and poly-dichloro-p-xylylene, are preferred. The latter parylene has a higher temperature-of-use range and greater chemical resistance.

Unlike most plastics, parylene is not produced and sold as a polymer. Instead, the parylene process starts with a dimer rather than a polymer and, in commercial equipment, polymerizes it on the surface of an object. To achieve this the dimer must first go through a two-step heating process. The solid dimer is converted to a reactive vapor of the monomer and then, when passed over room temperature objects, the vapor will condense as a polymeric coating. Union Carbide Corporation publication titled "Parylene Environmentally Compatible Conformal Coatings", copyrighted 1971, 1974, 1976 and 1979, discloses additional information and equipment that can be employed to coat the surface of objects with a parylene film. It is known that parylenes are produced by vapor phase deposition in a variety of forms. By effecting polymerization in an aqueous system, parylene can be obtained in a particulated form. It can also be deposited on a cold condenser, then stripped off as a free film, or it can be deposited onto the surface of an object as a continuous adhering coating in thicknesses ranging from 0.2 microns to 3 mils or more. The process for producing parylene and the process for vapor depositing it on substrates are disclosed in U.S. Pat. Nos. 3,288,728, 3,342,754, 3,503,903 and 3,600,216.

The disclosures in these U.S. patents and the above-referred-to publication are incorporated herein by reference.

Typical polyamides that are suitable for use in this invention are the polyamides formed as condensation products of polyamides and the dibasic acids obtained when certain unsaturated fatty acids are dimerized.

The preferred polyamides are fatty polyamides which are described on pages 597 to 615 in Volume 10 of "Encyclopedia of Polymer Science and Technology", Interscience Publishers (John Wiley & Sons, Inc.), New York. Briefly, fatty polyamides are produced by reacting a polybasic acid with a polyfunctional amine. Generally the polybasic acids are principally dibasic acids formed by the dimerization of, for instance, a $C_{18}$ unsaturated fatty acid derived from an unsaturated vegetable oil. Such dimers are then reacted with a diamine such as ethylenediamine, propylenediamine, and the like. Fatty polyamides are available commercially from, for example, General Mills, Inc., Minneapolis, Minnesota and/or the Henkel Corporation under the tradename of "VERSALON". The fatty poly amides can be employed in any physical shape or configuration that is appropriate for the particular protective appication to be performed. For example, the fatty polyamide can be applied as a coating over the surface to be protected or the fatty polyamide can be employed as a seal or other configuration. U.S. Pat. No. 3,922,178 discloses the use of fatty polyamides and the disclosure so made is incorporated herein by reference.

The use of cured epoxy polyamide resins is disclosed in U.S. Pat. No. 3,713,896 and such disclosure is incorporated herein by reference. Specifically the mixtures of epoxy and polyamide suitable for use in this invention could range from 5¾ parts by weight of polyamide to 1 part of epoxy to 1 part polyamide to 3 parts epoxy.

In order to improve the ability of the seal to contain caustic electrolytes, such as an aqueous potassium hydroxide solution, it is necessary to fill the microcracks or microrough surfaces of the cover and the container thereby eliminating any paths for electrolyte leakage. It has been observed that the standard type gaskets, such as nylon, which are highly compressed between the metal container and cover, are fairly rigid materials and thus enable to conform exactly to the surface of the metal. In addition, with the use of fatty polyamides, epoxy resins, asphalt, or cured-epoxy polyamides, an improvement is noted but it is believed that it does not completely fill all of the microcracks or passages between the interface of the cover and the container. It has been found, however, that an intermediate layer of parylene disposed between the gasket and the polyamide, epoxy resin, asphalt or cured-epoxy polyamide resin layer will substantially fill the microcracks at the interface of the cover and the container and, therefore, provide an effective seal against electrolyte leakage. Thickness of the parylene film can vary and preferably can be between about 0.0001 to about 0.0015 inch, and more preferably be between about 0.0003 and about 0.001 inch Parylene films of 0.0015 inch or more are subject to being torn when assembled into the cell and thereby provide a path for electrolyte leakage from the cell. Preferably, the parylene film is deposited on the gasket by vapor phase deposition and simultaneous polymerization of the p-xylylene.

The preferred embodiment of this invention would comprise a sealing closure consisting of a nylon gasket having a vapor phase-deposited parylene film, such as polymonochloro-p-xylylene, in a thickness range of about 0.001 inch or less over which is deposited a coating of fatty polyamide applied from a solution of about 50 grams of fatty polyamide per liter of a solvent, such as trichloroethylene. The seal so described is compressed between the interface of the cover and the container of various size cells in a conventional manner producing an excellent liquid tight seal for the cells. It is believed that the parylene enables the sealant to conform better to the micro-structure of the interface of the container and cover and, therefore, results in a highly effective sealant being forced into the micro-structure thereby preventing paths for electrolyte leakage.

EXAMPLE

Three lots of fifty cells were produced, each employing a zinc anode, an electrolyte of an aqueous NaOH or KOH solution, a monovalent silver oxide containing cathode and a dual separator consisting of a cellulosic barrier film and an electrolyte absorbent layer disposed between the anode and the cathode. Components were assembled in various size button cell housings which were sealed with a conductive cover via a sealing closure disposed and compressed between the interface of the housing and the cover. Cell Lot No. 1 employed a sealing closure of a nylon gasket coated with a fatty polyamide which was applied by a solvent mixture of 50 grams of a fatty polyamide to 1 liter of the solvent trichloroethylene. The fatty polyamide employed was Swift's 610 obtained from the Swift Chemical Company.

The sealing means for Cell Lot No. 2 consisted of a nylon gasket having a silane layer over which a film of polymonochloro-p-xylylene was deposited. The polymonochloro-p-xylylene was applied by heating the dimer, para-xylylene, to a reaction vapor pressure of the monomer stage and then polymerizing and coating the gaskets in a one-step process. This deposited a parylene film of about 0.001 inch thick on the gasket. The parylene dimer was obtained commercially from Union Carbide Corporation under the tradename "Parylene C".

Cell Lot No. 3 employed a sealing closure consisting of a nylon gasket having deposited thereon a silane layer over which a parylene film 0.001 inch thick was deposited as described in conjunction with Cell Lot No. 2 and then a fatty polyamide coating was deposited on top of the parylene film as described in conjunction with Cell Lot No. 1. Each of the cells in each lot was then stored for 12 months at room temperature and then each of the cells was examined to see if any leakage and/or salting appeared at the interface of the sealing means and the container, and/or the interface of the cover and the sealing means. On visual observation it was noted whether there was light salting (L) as observed under 20× magnification, medium salting (M) as observed under 3× magnification, or heavy salting (H) as observed without magnification at the negative (interface of the sealing means and the cover) and the positive (interface of the container and the sealing means) terminals. By salting is meant a whitish residue as existing at the seal area of the cells. In addition, any liquid appearing at either the positive or negative terminal area was noted. The observations so made are presented in the Table and clearly show that the sealing means in accordance with this invention produces a marked improvement in providing a liquid tight seal for alkaline cells.

TABLE

OBSERVED LEAKAGE AND/OR SALTING

| CELL SIZE | CELL LOT 1 Positive Terminal | CELL LOT 1 Negative Terminal | CELL LOT 1 % Total (*) | CELL LOT 2 Positive Terminal | CELL LOT 2 Negative Terminal | CELL LOT 2 % Total (*) | CELL LOT 3 Positive Terminal | CELL LOT 3 Negative Terminal | CELL LOT 3 % Total (***) |
|---|---|---|---|---|---|---|---|---|---|
| *0.310 inch diameter by 0.140 inch high | 9L | 0 | 18% | 14L 28H 5M 2W | 10L | 96% | 1H | — | 2% |
| *0.455 inch diameter by 0.165 inch high | 5L 14W | 5L 3W | 44% | 8L 38H 4W | 2L 16H | 98% | 1L 5W | 4L | 16% |
| **0.310 inch diameter by 0.140 inch high | 3L 2H | — | 10% | 16L 5M | — | 42% | 5L | — | 10% |
| **0.374 inch diameter by 0.105 inch high | — (only 15 cells in this lot) | — | 0% | 3L 7H 1M | 1H | 22% | — | — | 0% |

*Electrolyte KOH
**Electrolyte NaOH
***% Total = % leakage (W) and/or salting (L,M,H) observed at one or more locations on the cells based on the total number of cells.
L = Light Salting
M = Medium Salting
H = Heavy Salting
W = Cell is Wet

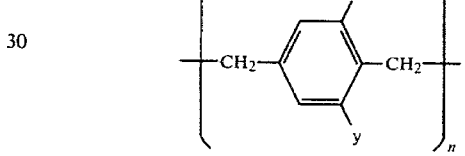

where x and y are H or Cl and n is greater than 5000.

What is claimed is:

1. A sealed electrochemical cell comprising a cathodic material, an anodic material and an electrolyte housed in the container sealed at its open end by a closure means which comprises a cover, a nonconductive gasket and a layer selected from the group consisting of a polyamide, an epoxy resin, asphalt and a cured epoxypolyamide resin, said gasket and said layer disposed and compressed between the interface of the cover and the container; the improvement being a thin film of parylene disposed between the gasket and the layer interface thereby forming a fluid tight seal between the cover and the container of the cell.

2. The sealed electrochemical cell of claim 1 wherein the parylene film is between about 0.0001 inch to about 0.0015 inch thick.

3. The sealed electrochemical cell of claim 1 wherein the parylene film is between about 0.0003 inch and about 0.001 inch thick.

4. The sealed electrochemical cell of claim 1 wherein the parylene film has the formula 5. The sealed electrochemical cell of claim 1, 2, 3 or 4 wherein the gasket is selected from the group consisting of nylon, polypropylene, ethylene-tetra-fluoro-ethylene copolymer and high density polyethylene, the layer is a polyamide layer, and the parylene is selected from the group consisting of polymonochloro-p-xylylene and polydichloro-p-xylylene.

6. The sealed electrochemical cell of claim 1 wherein the gasket is nylon, the layer is a fatty polyamide and the parylene film is between about 0.0003 and about 0.001 inch thick.

7. The sealed electrochemical cell of claim 1 or 6 wherein the parylene is polymonochloro-p-xylylene.

8. The sealed electrochemical cell of claim 1, 2, 3 or 4 wherein the electrolyte is an aqueous potassium hydroxide or sodium hydroxide solution, the layer is a polyamide and the film of parylene is between about 0.0003 and about 0.001 inch thick.

9. The sealed electrochemical cell of claim 1, 2 or 3 wherein the electrolyte is an aqueous potassium hydroxide solution, the gasket is nylon, the layer comprises a fatty polyamide and the parylene is selected from the group consisting of polymonochloro-p-xylylene and polydichloro-p-xylylene.

* * * * *